(12) United States Patent
Woodward

(10) Patent No.: US 10,248,386 B2
(45) Date of Patent: *Apr. 2, 2019

(54) GENERATING A SOFTWARE COMPLEX USING SUPERORDINATE DESIGN INPUT

(71) Applicant: Symphore, LLC, Atlanta, GA (US)

(72) Inventor: Christopher Woodward, Atlanta, GA (US)

(73) Assignee: Symphore, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/634,651

(22) Filed: Jun. 27, 2017

(65) Prior Publication Data

US 2017/0293473 A1 Oct. 12, 2017

Related U.S. Application Data

(63) Continuation of application No. 14/819,662, filed on Aug. 6, 2015, now Pat. No. 9,720,652.

(51) Int. Cl.
| | |
|---|---|
| *G06F 9/44* | (2018.01) |
| *G06F 8/20* | (2018.01) |
| *G06F 8/70* | (2018.01) |
| *G06F 8/35* | (2018.01) |
| *G06F 8/71* | (2018.01) |

(52) U.S. Cl.
CPC ............... *G06F 8/20* (2013.01); *G06F 8/35* (2013.01); *G06F 8/70* (2013.01); *G06F 8/71* (2013.01)

(58) Field of Classification Search
CPC ....................................................... G06F 8/20
USPC .................................................. 717/104–108
See application file for complete search history.

(56) References Cited

U.S. PATENT DOCUMENTS

| | | | |
|---|---|---|---|
| 5,495,610 A | 2/1996 | Shing | |
| 5,911,076 A * | 6/1999 | Acker | ............. G06F 8/447 717/104 |
| 6,269,473 B1 * | 7/2001 | Freed | ............. G06F 8/20 703/22 |
| 6,275,976 B1 | 8/2001 | Scandura | |

(Continued)

OTHER PUBLICATIONS

Ji et al, "Interactive Software Architecture Design with Modeling & Simulation ", ACM, pp. 305-306, 2004 (Year: 2004).*

(Continued)

*Primary Examiner* — Anil Khatri
(74) *Attorney, Agent, or Firm* — Fish & Richardson P.C.

(57) ABSTRACT

Methods, systems, and apparatus, including computer programs encoded on a computer storage medium, for generating software complexes. In one aspect, a method includes defining a software complex that is to include a group of software members that share information inherent to the software complex and act on that information. The defining includes receiving selections of design aspects as superordinate design inputs for the software complex and storing the superordinate design inputs in a source data store. The superordinate design inputs are compiled in the source data store using a software complex architectural language compiler. An in-memory model of the software complex is generated as an output of the compilation. Software member emitters are selected. For each selected software member emitter, a software member of the defined type of the selected software member emitter is generated.

20 Claims, 7 Drawing Sheets

(56) References Cited

U.S. PATENT DOCUMENTS

| | | | |
|---|---|---|---|
| 6,505,342 B1 * | 1/2003 | Hartmann | G06F 11/3688 |
| | | | 714/E11.208 |
| 6,662,357 B1 * | 12/2003 | Bowman-Amuah | G06F 8/20 |
| | | | 717/120 |
| 6,931,624 B1 | 8/2005 | Snider | |
| 7,003,777 B2 | 2/2006 | Hines | |
| 7,231,267 B2 * | 6/2007 | Bournas | G06F 8/20 |
| | | | 700/91 |
| 7,233,952 B1 | 6/2007 | Chen | |
| 7,533,365 B1 * | 5/2009 | Hogstrom | G06F 8/10 |
| | | | 717/104 |
| 7,644,390 B2 | 1/2010 | Khodabandehloo | |
| 7,735,062 B2 | 6/2010 | de Seabra E Melo | |
| 7,752,606 B2 * | 7/2010 | Savage | G06F 8/20 |
| | | | 717/100 |
| 7,761,845 B1 | 7/2010 | Perrin | |
| 7,761,846 B2 * | 7/2010 | Hayles | G06F 8/34 |
| | | | 715/763 |
| 7,917,890 B2 | 3/2011 | Barcellona | |
| 8,006,223 B2 * | 8/2011 | Boulineau | G06F 8/20 |
| | | | 705/7.22 |
| 8,010,938 B2 * | 8/2011 | Elaasar | G06F 8/10 |
| | | | 717/104 |
| 8,024,703 B2 * | 9/2011 | Gerken | G06F 8/38 |
| | | | 717/104 |
| 8,056,048 B2 | 11/2011 | Stevenson | |
| 8,250,521 B2 | 6/2012 | Zhang | |
| 8,359,566 B2 | 1/2013 | Chaar | |
| 8,365,138 B2 | 1/2013 | Iborra | |
| 8,418,123 B2 | 4/2013 | Kamiyama | |
| 8,533,677 B1 | 9/2013 | Pleis | |
| 8,584,080 B2 | 11/2013 | Gery | |
| 8,601,490 B2 | 12/2013 | Sureshan | |
| 8,689,173 B2 | 4/2014 | Elaasar | |
| 8,707,250 B2 | 4/2014 | Kung | |
| 8,843,879 B2 * | 9/2014 | Howard | G06F 8/20 |
| | | | 717/104 |
| 8,930,885 B2 | 1/2015 | Salle | |
| 8,943,465 B2 * | 1/2015 | Broadfoot | G06F 8/10 |
| | | | 717/104 |
| 9,003,357 B1 * | 4/2015 | Andrade | G06F 8/35 |
| | | | 717/104 |
| 9,043,458 B2 * | 5/2015 | Balaji | H04L 43/04 |
| | | | 709/217 |
| 9,483,329 B2 * | 11/2016 | Ritter | G06F 8/10 |
| 9,703,443 B2 * | 7/2017 | Korn | G06F 3/0481 |

OTHER PUBLICATIONS

Dekel, "A Study of Artifact Creation and Use in Collaborative Object-oriented Software Design", ACM, pp. 748-749, 2006 (Year: 2006).*

Robillard, "Sustainable Software Design", ACM, pp. 920-923, 2016 (Year: 2016).*

Ouyang et al, "Enhancing Design Reusability by Clustering Specifications", ACM, pp. 493-499, 1996 (Year: 1996).*

Kiczales et al, " Open Implementation Design Guidelines " ACM, pp. 481-490, 1997 (Year: 1997).*

Khatri et al, "A Software Reuse Reference Model Approach in Developing an Automated Educational System for Patients Health Care Management ", ACM, pp. 675-678, 2001 (Year: 2001).*

Robillard, "sustainable Software Design", ACM, pp. 920-923, 2016.

Chand et al., "Logical Construction of Software", ACM, vol. 23, No. 10, pp. 546-555, 1980.

McGregor et al., "Quantifying Value in Software Product Line Design", ACM, pp. 1-7, 2011.

Ouyang et al, "Enhancing Design Reusability by Clustering Specifications", ACM, pp. 493-499, 1996.

Eden et al, "Architecture, Design, Implementation", IEEE, pp. 149-159, 2003.

Lochmann et al, "A Unifying Model for Software Quality", ACM, pp. 3-10, 2011.

* cited by examiner

GENERATING A SOFTWARE COMPLEX USING SUPERORDINATE DESIGN INPUT

CROSS-REFERENCE TO RELATED APPLICATIONS

This application is a continuation application of, and claims priority to, U.S. patent application Ser. No. 14/819,662, titled "GENERATING A SOFTWARE COMPLEX USING SUPERORDINATE DESIGN INPUT," filed on Aug. 6, 2015. The disclosure of the foregoing application is incorporated herein by reference in its entirety for all purposes.

BACKGROUND

A software complex is a group of one or more software members that share information and that have operations that act on that information. Generally, in order to develop a software complex, whether it be for a single user on a local computer or a multi-tier, multi-component, multi-user, multi-platform client environment software system, a team of developers and other information technology (IT) professionals must specify, design, build, test, and commission the software complex.

At a high level, a software complex is developed through a three-step process of design, develop, and produce, expressed as Input→Build→Output. In this expression, the "input" is the collection of all design specifications, requirement specifications, research, analysis, decisions, experiences, techniques, knowledge, know-how, ideas, and expertise of the development team(s) and other subject matter experts for producing a unique output. The "build" is the effort exerted by the development team(s) to process the information and write(s) the actual code that becomes the deliverable for the software complex. Thus, the "build" represents a group of people that take the "input," process it, and incur the effort required to build the "output." The "output" is the desired software complex.

Generally, to truly satisfy a particular input so that a particular output is produced, there is an unstructured collection of implicit and explicit decisions, experiences, techniques, knowledge, written documents, and ideas. The whole input does not exist in any tangible form as some of the information exists in the minds of the team members and subject matter experts. In fact, even explicit input parameters may be interpreted differently among different team members, depending on their experience and knowledge. Consider, for example, a software complex that manages lists of people's names as part of its functionality. One input to such a system may be "all last names shall have a maximum length of 25 characters." This is straightforward input and is not easily misunderstood. However, an input requirement like "the list shall be sortable" is open to many technical interpretations, such as "sorted by last name," "sorted by first name," "sorted by both first name and last name," "sorted alphabetically ascending," or "sorted alphabetically descending."

In traditional software development, many of the key aspects of the "input" are inadvertently handled completely independently of one another. Some of the aspects are answered explicitly with an extensive definition. Other aspects are never addressed directly, resulting in implicit decisions being improvised during the course of the software development. While some aspects are documented, others precipitate based on the experience and preferences of the development team. There are often numerous interdependencies between aspects of the "input." Without a mechanism to manage the complexity of the interdependencies, logical collisions do occur and can ripple through a project causing less than desirable results, inefficiencies, and higher software development costs.

Another problem with traditional software development is that individual components of a software complex are typically built by different individuals, if not by completely different groups, divisions, subcontractors, or companies. In such cases, the subset of design aspects pertaining to a particular component may be managed completely separately from the whole of the software complex. Some IT professionals believe that components of a software complex can be cleanly separated and distributed to different IT professionals (e.g., different development teams) for completion. The loss of integrity between the whole and the parts makes it very difficult to produce a sophisticated software complex successfully. Consequently, many software systems are built today in a very craftsman-like manner.

SUMMARY

This specification describes technologies relating to generating a software complex based on superordinate design inputs. A software complex can include a group of software members, such as executables, database schemas, libraries, source code, etc. A system can use a single source of superordinate design inputs to determine which software members should be included in the software complex and to generate each software member of the software complex. In some implementations, the system generates, based on the superordinate design inputs, an in-memory model that represents a conceptual form of the software complex. The in-memory model can include software implements that represent how to generate a particular software feature or element. Software emitters can output software members of the software complex based on information in the in-memory model.

In general, one innovative aspect of the subject matter described in this specification can be embodied in methods that include the actions of defining a software complex that is to include a group of software members that share information inherent to the software complex and act on that information. The software members can include at least an executable and a software asset. Defining the software complex can include receiving selections of design aspects as superordinate design inputs for the software complex. A superordinate design input is a codification of a design aspect in a software complex architectural language. The superordinate design inputs can be stored in a source data store. The superordinate design inputs in the source data store can be complied using a software complex architectural language compiler. An in-memory model of the software complex can be generated as an output of the compilation. Software member emitters can be selected based on the superordinate design input and the in-memory model of the software complex. Each software member emitter can be configured to emit a software member of a defined type. For each selected software member emitter, a software member of the defined type of the selected software member emitter can be generated. The generated software member is subject to the superordinate design inputs compiled using the software complex design language compiler. At least two software members are subject to at least a same superordinate design input. Other embodiments of this aspect include corresponding systems, apparatus, and computer programs, configured to perform the actions of the methods, encoded on computer storage devices.

These and other embodiments can each optionally include one or more of the following features. In some aspects, the software members generated by the software member emitters include a server executable, a client executable, and a database schema. Each software member can be a tangible software deliverable. In some implementations, the software members generated by the software member entities function together to form a fully functioning software complex.

In some aspects, generating the in-memory model can include identifying an interdependency between two or more software members based on the superordinate design inputs and generating, based on the identified interdependency, in the in-memory model respective software implements for the two or more software members that cause respective emitters to emit two or more software members that are interoperable within the software complex. The two or more software members emitted by the respective emitters can operate on data defined by one of the superordinate design inputs common to each of the two or more software members.

In some aspects, the in-memory model represents a conceptual form of the software complex for use in generating the software members. The conceptual form can specify characteristics of the software complex and interdependencies between software members of the software complex.

In some implementations, generating the in-memory model includes selecting software implements from defined software implements based on the superordinate design inputs. Each defined software implement can correspond to a particular software feature and can specify an implementation of the particular software feature to be implemented in one or more types of software members. Each selected software implement can correspond to a feature of the software complex specified by one or more of the superordinate design inputs. Generating a software member by a particular software member emitter can include generating a particular software member that includes a software feature defined by a particular superordinate design input using the selected software implement that corresponds to the particular software feature.

In some aspects, the superordinate design inputs include a patternable design aspect that is a software design aspect that can be used in multiple different software complexes. In some implementations, the superordinate design inputs include a non-patternable design aspect that represents a custom software construct that is specific to the defined software complex. In some aspects, the superordinate design inputs include a non-patternable design aspect that includes non-patternable code that is specific to at least one of a particular software member or a particular type of software member.

In some aspects, selecting the software emitters includes selecting a particular software emitter that generates software executables that are executed on a particular software platform based on a software platform defined by the superordinate design input. In some aspects, the software asset includes at least one of a file format, a file, a database schema, a library, a stored procedure, a script, source code, a bitmap, or an image. In some implementations, each software member has a distinct function in the software complex that is different from a function of each other software member in the software complex.

Particular embodiments of the subject matter described in this specification can be implemented so as to realize one or more of the following advantages. By generating an entire, or substantial portion of, a functioning software complex from a single source of superordinate design input, the development cost and number of inconsistencies, errors, and opposing interdependencies between software members can be substantially reduced. For example, the cost of generating a sophisticated software complex is greatly reduced by automating the coding process that would typically require several development teams that may produce software members that interact defectively (e.g., buggy).

Automating the coding process from a single source of superordinate design inputs also reduces the amount of time required to develop a software complex. The time and cost of integrating software members developed from the bottom up by separate software developers can be reduced or eliminated by generating the software members from a single source of superordinate design inputs and using an automated coding process that takes into account each interdependency between individual software members. This also improves the final product as the individual software members are generated to interact and share data in a consistent manner.

Automating the coding process from a single source of superordinate design inputs allows for the whole of the "output" in the form of software members to be created with best-practices or preferred approaches uniformly rather than depending on inconsistencies of team member experience. Requirements and characteristics of the software complex can be gathered in a systematic and thorough fashion so that all of the technical dependencies are gathered completely. For example, logical collisions can be resolved up front, e.g., before coding of software members begins.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
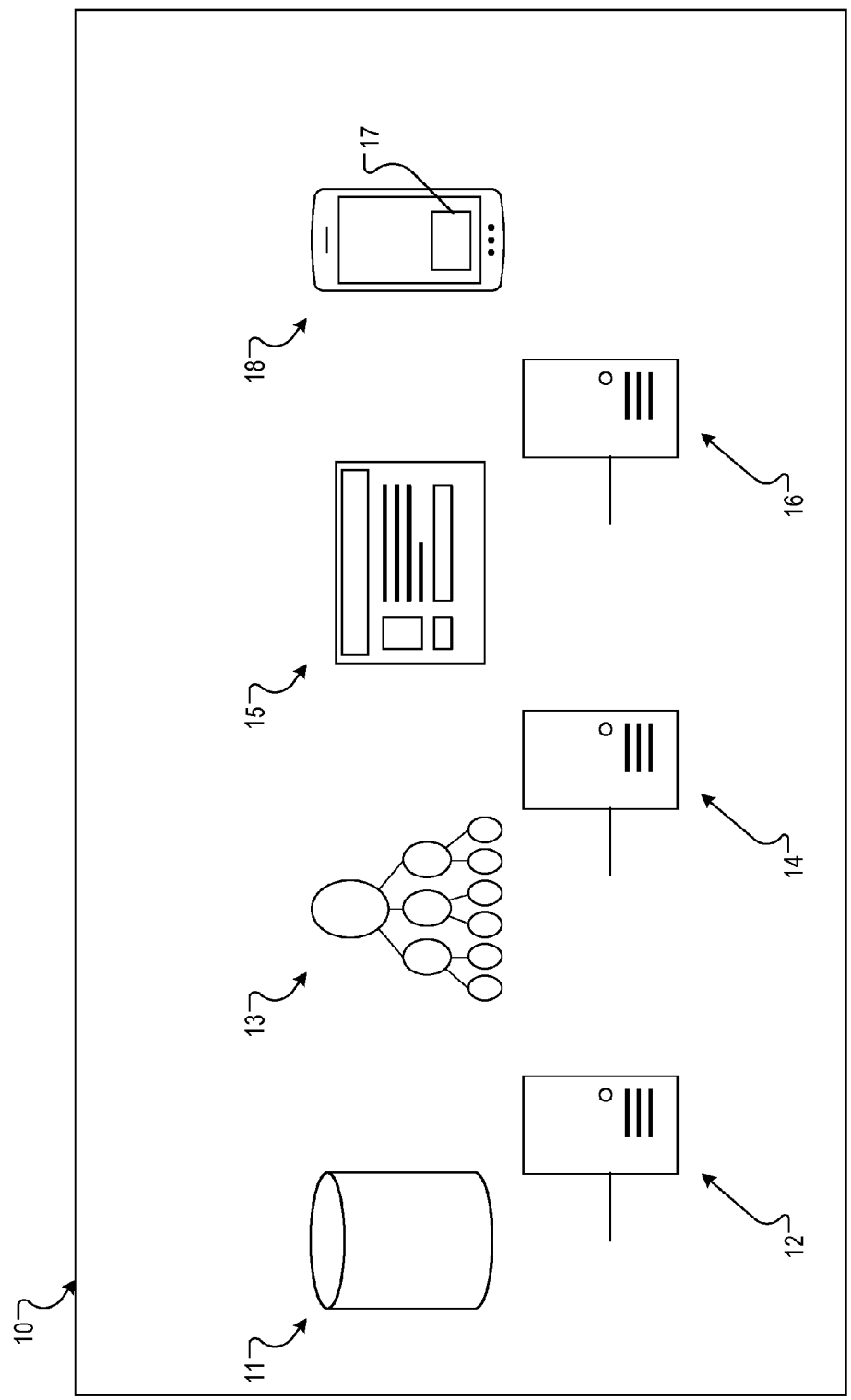
FIG. 1A is a block diagram of an example software complex.

A system can generate a software complex based on superordinate design inputs. A software complex is a group of software members that share information that is unique and/or inherent to the software complex and that act on that information. Superordinate design inputs are highest order design aspects that together, as a group, affect the design and implementation of each software member of the software complex. A software member is a tangible software deliverable of the software complex. Example types of software members include executables, database schemas, libraries, source code, stored procedures, scripts, business rules/logic, binaries, bitmaps, images, and file formats.

A basic example of a software complex is a word processing software application with an executable and a file format for storing documents. An example of a more sophisticated software complex is a suite of multiple software applications that function on different target platforms (e.g., desktop version, web version, and mobile versions), a common database, common server components, and business rule components, and that supports multiple concurrent users. A particular example of a sophisticated software complex is a social networking system that includes backend servers, web servers, databases, and client applications for one or multiple different types of client devices. Some of these software members may have a variety of integral components, e.g., business rule processing components, human interface components, and client-side proxy (e.g., client-side memory models and caching).

As described in detail below, the system can determine which software members should be included in a software complex and generate each software member of the software complex based on a single source of superordinate design inputs, e.g., that are specified using a software complex architectural language. For example, the system can generate executables for the servers and clients, database schemas for the databases, and each other appropriate software member of a software complex based on the single source of superordinate design inputs. The single source of superordinate design inputs can include each design aspect needed to generate all of the software members of a software complex. In some implementations, the software members function together to form a fully functioning software complex, e.g., without further human programming of the software members. For example, the software members generated by the system can be installed on appropriate devices and, after installation, interact to form a fully functioning complex.

The approach to generating software complexes described herein allows for creating a software complex at the most superior architectural level. In some implementations, this most superior architectural level is the level at which no additional design inputs exist for the software complex. These superordinate design inputs encompass any possible input that will influence the production of software members of the software complex. In this way, the software complex's design is abstracted away from any particular computer platform or operating system. This approach allows the software designers to capture all of the intelligence of the target software complex irrespective of a particular software technology. Once the software complex is designed, the system allows the designers to choose the target platform(s). In addition, if the designer subsequently wants to add another platform, the system can re-generate the software complex based on updated inputs that include the added platform. Thus, as new environments, technologies, and operating systems emerge, the designers can produce their system on those without reworking the system design.

FIG. 1A is a block diagram of an example software complex 10. The example software complex 10 includes a database 11 provided by a database server 12, a server application 13 executed by a backend server 14, a web application 15 (e.g., web application that includes client components and user interface components) and that is executed by a web server 16, and a client application 17 (e.g., client application that includes client components and user interface components) executed on a client device 18 (e.g., a mobile device or computer). The database 11, server application 13, web application 15, and client application 17 are each a software member generated for the software complex 10. The server application 13, the web application 15, and the client application 17 may be in the form of executable files that are executed by the backend server 14, the web server 16, and the client device 18, respectively.

Although not shown, the software complex 10 can include other software members, e.g., libraries, file formats, and/or different client applications. For example, the client application 17 may be a native application specifically designed to run on a particular user device operating system and machine firmware. The software complex 10 can include other client applications designed to run on other user device operating systems. In a particular example, the client application 17 may be designed for a particular smartphone operating system, while another client application may be designed for a desktop/laptop computer operating system.

The software members 11, 13, 15, and 17 share information inherent to the software complex 10 and act on that information. For example, the server application 13, the web application 15, and the client application 17 may each access, store, and modify data stored in the database 11. The information, and type of information, shared and acted on by software members of a software complex is unique and/or inherent to the software complex and different from information shared and acted on by other software complexes. For example, each software complex is unique and not simply a recompilation of a previously generated application. Each software complex may share and act on a group of information that is different from a group of information shared and acted on by other software complexes.

Each software member 11, 13, 15, and 17 share a common purpose that is unique or inherent to the software complex 10. For example, the purpose of a social networking software complex may be to allow users of the social networking software complex to share content (e.g., messages, photos, and videos) with other users. The purpose of a word processing software complex is to allow users to generate text-based documents.

Each software member of the software complex 10 performs some function that supports the common purpose. In addition, each software member 11, 13, 15, and 17 has a distinct function in the software complex 10 that is different from the function of each of the other software members in the software complex 10. For example, the client application 17 may provide client side functionality on a particular type of device while a database 11 provides data storage and organization functions for the software complex 10.

The software members of a software complex, e.g., the software complex 10, can include one or multiple executables (e.g., applications or components) and one or more other software assets. Executables include executable files (e.g., having .exe and .dll extensions) that are executable by computing devices. Software assets include other software resources, e.g., database schemas, libraries, source code, stored procedures, scripts, business rules/logic (e.g., in the form of executables or source code), binaries, bitmaps, images, and file formats.

The software members of a software complex, e.g., the software complex 10, can be stand-alone components or components designed to fit into third-party software environments or frameworks. Examples of stand-alone components include applications or API's executed by mobile devices or desktop computers, databases (e.g., databases based on database schemas output by a software complex generator), and stored procedures. Examples of components designed to fit into third-party environments or frameworks include executables, resources, and other software assets for a specific web server to produce web pages for the software complex.

Figure 1B:
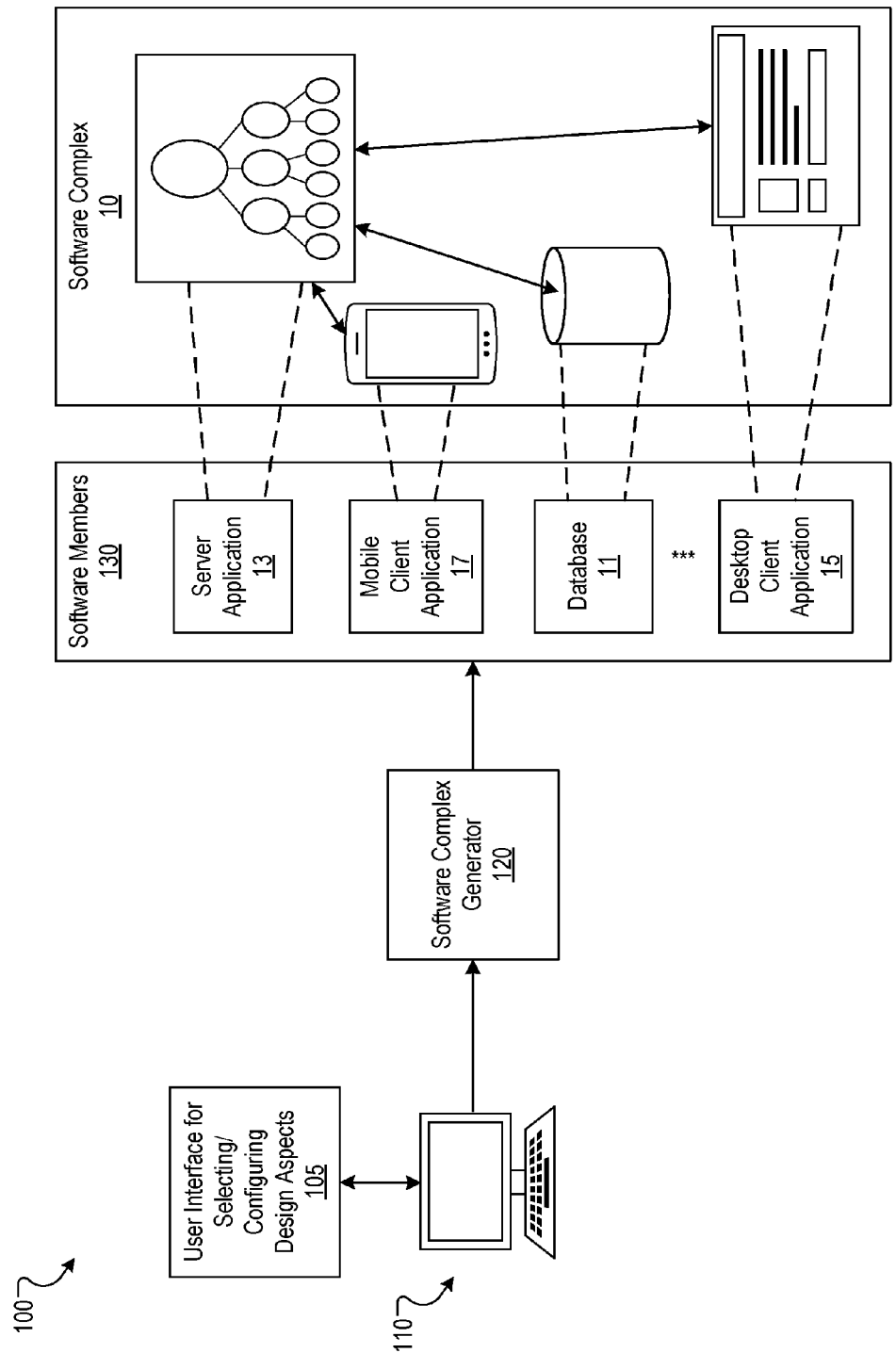
FIG. 1B is a block diagram of an example environment in which a software complex generator generates software complexes.

FIG. 1B is a block diagram of an example environment 100 in which a software complex generator 120 generates software complexes. The software complex generator 120 generates software complexes, e.g., the software complex 10, based on superordinate design inputs defined using a software development terminal 110. The software development terminal 110 is a computer that provides a user interface 105 that enables users, e.g., software developers, to specify and/or select design aspects for a software complex. A design aspect is an input parameter that specifies some characteristic, feature, or element of the software complex. For example, one design aspect may specify that the software complex is to include an undo/redo feature. Another design aspect may define a data object, its data structure, and/or other characteristics of the data object. Other examples of design aspects are described below.

In some implementations, the user interface 105 allows users to specify and/or select the design aspects using a software complex architectural language. The software complex architectural language enables a user to codify all of the design aspects used to build a software complex. As described in more detail below, the software complex architectural language is flexible and extensive so that any number of arbitrary software complexes can be defined and built completely using the software complex generator 120. The software complex architectural language can include a particular syntax that allows users to select from a collection of available design aspects, define characteristics of the design aspects, and/or define custom code for a software complex. For example, the software complex architectural language can enable a user to select that particular data should be persisted, select that the persistence mechanism should be a database, and select the type of database for storing the data.

Using the software complex architectural language, a development team can provide all design aspects of an entire software complex in a very structured and formal way. Many unforeseen conflicts between seemingly unrelated or cross-functional aspects can be resolved up front, e.g., by the software complex generator 120, long before the conflict is recognized by team members. Many conflicts can receive attention that may have never otherwise been noticed or addressed. The integrity of design aspects for seemingly different parts of the software complex is managed by the software complex architectural language, and a compiler and in-memory model builder described below.

The user interface 105 receives the design aspects for a software complex as superordinate design inputs for the software complex. Each superordinate design input can be a codification of a design aspect in the software complex architectural language. The software development terminal 110 provides the superordinate design inputs to the software complex generator 120. The software complex generator 120 generates a software complex using the superordinate design inputs. That is, the software complex generator 120 generates the software members that make the software complex a functional software system.

For the example software complex 10, the software complex generator 120 receives superordinate design inputs from the software development terminal 110 and generates a group of software members 130. The group includes the database 11, server application 13, web application 15, and client application 17 that form the functioning software complex 10. The software complex generator 120 can generate the database 11, server application 13, web application 15, client application 17, and any other appropriate software members for the software complex 10 based on the superordinate design inputs generated using the software complex architectural language. The software members 11, 13, 15, and 17 can be installed on appropriate devices to form a fully functional software system. For example, the software members 11, 13, 15, and 17 are fully functional as a group as output by the software complex generator 120 without the need for any further human programming of the software members 11, 13, 15, and 17. Once installed on the appropriate devices, the software members 11, 13, 15, and 17 interact, share data, and act on the shared data to perform the functions of the software complex 10.

In some implementations, the software complex generator 120 generates a portion of the software complex 10 and/or a portion of a particular software member of the software complex and leaves some programming and/or configuration for a software developer. For example, the software complex generator 120 may generate the code, e.g., in one or more software members, for presenting user interfaces and handling data communications between the user interfaces and other software members. The software developers can then attach images and other graphics to these elements to form a fully functional user interface for the software complex 10.

Figure 2A:
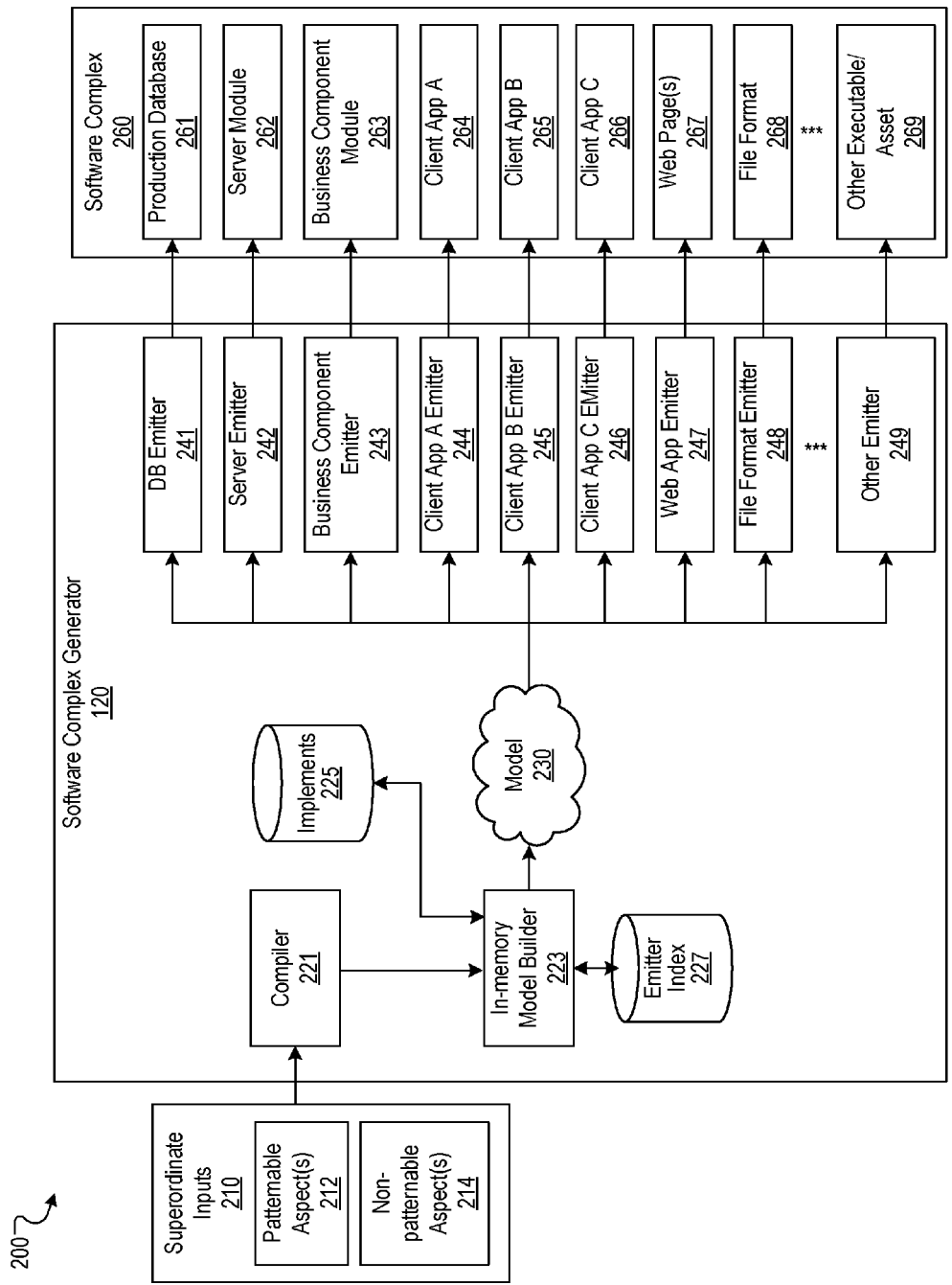
FIG. 2A is a block diagram of an example environment in which a software complex generator generates software complexes.

FIG. 2A is a block diagram of an example environment 200 in which a software complex generator 120 generates software complexes. The software complex generator 120 includes a compiler 221, an in-memory model builder 223, and a set of software member emitters 241-249. The compiler 221, which may be a software complex architectural language compiler, receives an input file (or multiple input files) that includes superordinate design inputs 210, e.g., from a software development terminal. For example, the input file(s) may include the superordinate design inputs 210 written in the software complex architectural language.

The superordinate design inputs 210 can include patternable design aspects 212 and/or non-patternable design aspects 214. A patternable design aspect 212 is a software design aspect that can be used in multiple different software complexes. A patternable design aspect can represent a high-level software construct that is useful repetitively throughout one of more software development projects. In some implementations, the software complex architectural language enables users to select from a set of patternable design aspects and to define characteristics of the patternable design aspects. For example, a user may use the software complex architectural language to select for which operating systems or platforms client applications or components should be generated. In another example, the user may use the software complex architectural language to specify that particular types of data should be stored in a database and to select from multiple types of databases to store the data.

The set of patternable design aspects that can be selected and defined using the software complex architectural language may correspond to software features and/or elements that can be implemented in a best-practice or in a standard way, e.g., based on software patterns. As described in more detail below, software implements describe how to produce a single instance of a particular software feature or element. The software implements can be used, along with other contextual data, to determine how the patternable design aspects defined by a user in the superordinate design inputs are to be implemented in software members for a software complex.

The software complex generator 120 can enable, e.g., using the software complex architectural language, users to specify a wide variety of patternable design aspects 212 for a software complex. The patternable design aspects can be organized into several groups of first-level denominations. In some implementations, the patternable design aspects are grouped into the following seven categories: (1) system architecture, (2) application features, (3) technical features, (4) data definitions, (5) user interface definitions, (6) report definitions, and (7) workflows.

The patternable design aspects for the system architecture category enable users to define and parameterize the possible system architectures for a desired software complex. For example, the patternable design aspects for the system architecture category may enable users to select and/or define the number of tiers; the function of each tier; the storage mechanisms, e.g., none (e.g., local data), file (e.g., data stored in a file), or database (e.g., data stored in databases) and type of database; the target environment for each component of the software complex (e.g., different operating system platforms on which server and client applications will execute); whether there are software interfaces; data that will be shared between the software complex and extrinsic systems; whether multiple concurrent users will access the software complex simultaneously; whether and how to authenticate users; whether and what type of notifications; and/or security features of the software complex. The patternable design aspects for the system architecture category may enable users to define other appropriate features of the software complex's system architecture.

The patternable design aspects for the application features category enables users to define and parameterize the possible application features for the software complex. For example, the patternable design aspects for the application features category enables users to select and/or define user errors; use cases; business rules/logic; user roles in the system if any; privileges in the system if any; permissions in the system if any; audit logging; undo/redo; localization of data; and/or operations (e.g., copy, sort, move, login/logout, etc.). The patternable design aspects for the application features category may enable users to define other appropriate application features of the software complex.

The patternable design aspects for the technical features category enables users to define and parameterize the possible technical features for the software complex. For example, the patternable design aspects for the technical features category enables users to select and/or define whether the software complex supports transactions; whether there will be multi-threading; concurrency specifications (e.g., aggregate granularity, object granularity, or field granularity); and/or SaaS (e.g., none, multiple databases, or keyed (cubed) database). The patternable design aspects for the technical features category may enable users to define other appropriate technical features of the software complex.

The patternable design aspects for the data definitions category enables users to define and parameterize the possible data definitions for the software complex. For example, the patternable design aspects for the data definitions category enables users to select and/or define all of the data types in the software complex; protype; object chronological mutability; how objects are persisted (e.g., not persisted, in a file, or in a database); object notifications; object containers (e.g., none, folder, or magazine); object inheritance; object relationship attributes, (e.g., durability, association, composite, exclusive or multiple), and collection definition attributes (e.g., cardinality, ordinality, indexing, elemental, or associative); object permissions; identity (e.g., SaaS domain, unique, or not unique); object fields, object methods, object bounds/ranges, thumbnails, whether globally static or instance static; and/or whether singleton. The patternable design aspects for the data definitions category may enable users to define other appropriate data definitions of the software complex.

The patternable design aspects for the user interface definitions category enables users to define and parameterize the possible user interface designs for the software complex. For example, the patternable design aspects for the user interface definitions category enables users to select and/or define display screens; windows, views, lists, controls (e.g., text boxes, radio buttons, selectors, buttons, menus, control bars, etc.); security bindings; data bindings to data definitions; colors; styles; fonts; graphic arts assets (e.g., icons, pictures, etc.); and/or user flows). The patternable design aspects for the user interface definitions category may enable users to define other appropriate user interface designs features, and characteristics for the software complex.

The patternable design aspects for the report definitions category enables users to define and parameterize the possible report designs for the software complex. For example, the patternable design aspects for the user interface designs category enables users to select and/or define active/passive reporting; online or document-based reporting; dashboards; views; grids; charts; text; and/or data bindings. The patternable design aspects for the report definitions category may enable users to define other appropriate report designs, features, and characteristics for the software complex.

The patternable design aspects for the workflows category enables users to define and parameterize the system workflows for the software complex. For example, the patternable design aspects for the system workflows category enables users to select and/or define state machines; transitions; data bindings to data definitions; and/or user bindings. The patternable design aspects for the data definitions category may enable users to define other appropriate system workflows of the software complex.

The above examples of patternable design aspects can be selected and defined by a user using the software complex architectural language. In some implementations, the software complex architectural language allows users to select and define other patternable design aspects and/or other types of patternable design aspects in addition to, or in place of, the examples provided above. The set of patternable design aspects that can be selected and defined using the software complex architectural language can be updated to add, remove, or change patternable design aspects. For example, if a new type of operating system is introduced for client devices, the software complex generator 120 can be updated to generate client applications and components based on the new operating system, e.g., by adding new software implements and/or new software emitters. The software complex architectural language can also be updated to allow users to select the new operating system as a desired platform for client applications. For example, the software complex architectural language, or its compiler 221, may be updated to accept the name of the new operating system as a desired platform.

The non-patternable design aspects 214 represent custom software constructs that are specific to the software complex.

For example, a non-patternable design aspect 214 may include non-patternable software code that is specific to a particular software member or to a particular type of software member (e.g., all client application members or all database members). The software code may perform a custom task that is specific to the software complex and that is typically not used (or not previously used) in other software complexes. In some implementations, the software complex architectural language provides an implementation level (lower level than the patternable design aspects) syntax for defining custom, non-patternable features of the software complex.

The software complex architectural language may allow the custom code to reference or act on data or software features defined by patternable design aspects. For example, a user may define custom code that performs some action based on data of a data object defined using a patternable design aspect.

In some implementations, the software complex architectural language includes non-patternable keywords that a user can use to program the custom code. For example, the software complex architectural language may include keywords similar to that of a C-language style syntax (e.g., for implementation code) and/or keywords similar to that of an XML style syntax (e.g., for definitional code).

The software complex architectural language can enable a user to select which software members, which type(s) of software members, and/or which software emitters a non-patternable design aspect should be applied. For example, a user may define custom code for a client component that will be executed on a particular operating system. In this example, the user can specify using the software complex architectural language that the custom code should be included in the client component generated for the particular operating system.

Once the superordinate inputs 210 including patternable design aspect(s) 212 and/or non-patternable design aspect(s) 214 are received in one or more input file(s), the compiler 221 parses the input file(s) and checks the syntax and grammar of the superordinate design inputs 210 written in the software complex architectural language. The compiler 221 also evaluates the logic, integrity, and consistency of design aspects codified in the superordinate design inputs 210. If the compiler 221 determines that the superordinate design inputs 210 have the correct grammar, syntax and that the design aspects pass the evaluation, the compiler 221 provides the superordinate design inputs 210 to the in-memory model builder 223.

The in-memory model builder 223 builds an in-memory model 230 of a software complex 260 based on the superordinate design inputs 210. The in-memory model 230 represents a conceptual form of the software complex 260 for use in generating software members 261-269 of the software complex 260. The in-memory model 230 serves as a template to build the software complex 260 as the template has the conceptual form of the desired result. This conceptual form represents the software complex as a single logical entity and specifies the characteristics and features of the software complex 260 and the interdependencies between the software members 261-269.

The in-memory model 230 is specific to the particular set of superordinate design inputs 210. That is, for every input "x", the in-memory model 230 differs from other models (e.g., input "y") that are different from input "x". The in-memory model 230 represents the unique form of the output for input "x".

The in-memory model 230 can include a set of configured software implements that control how the software complex generator 120 produces the software members 261-269 of the software complex 260. A software implement 225 is a software representation of the information used to produce a single instance (e.g., a physical manifestation) of a software design feature or element. A software implement may be based on a software design pattern that is a high level concept of how to implement a software feature or element. The software design pattern may be based on best practices in the software industry or based on the experience of software developers who create the software design patterns.

In some implementations, a software implement 225 is a piece of code that represents how to generate a particular software feature or element. For example, a particular software implement may be a codified version of the particular feature or element that can be configured based on the surrounding context of other features defined by the superordinate design inputs 210.

The in-memory model builder 223 identifies the software implements for use in building the in-memory model 230 based on the superordinate design inputs 210. For example, the in-memory model builder 223 can identify each patternable design aspect 212 of the superordinate design inputs 210 and identify one or more software implements that should be used to implement the design aspect in one or more software members.

In some implementations, the in-memory model builder 223 selects the implements based on a context defined by the superordinate design inputs as a whole. The in-memory model builder 223 may determine what software members will be included in the software complex and the software implements that will be used to generate each software feature of each software member using multiple iterations of analyses of the superordinate design inputs. For example, the in-memory model builder 223 can evaluate the design aspects in multiple iterations to identify a set of software implements that will be used to generate the software members. The in-memory model builder 223 can also use implements identified in previous iterations, e.g., along with the design aspects, to identify additional or more specific software implements that will be used to generate the software members.

To illustrate, the in-memory model builder 223 may make a first pass through the design aspects and determine that a data object will be included in the software complex, that data of the data object will be stored in a database, and that an undo/redo feature will be included in applications. In this first iteration, the in-memory model may determine that a database implement, a data object implement, a localizable feature implement, and an undo/redo feature implement will be used. During a second iteration, the in-memory model builder 223 can use this information to determine that, based on the localizable feature implement, an additional data object implement must be used in this example. The additional data object implement may be a collection data object for storing multiple language-based representations of the original data object's corresponding data field.

The in-memory model builder 223 can build the in-memory model 230 by configuring the identified software implements 225 based on the context defined by the superordinate design inputs 210. For example, the actual code for particular software features may vary based on the design inputs selecting a particular operating system on which the code will be executed, the design inputs selecting the type of data storage to be used, and/or other features of the software complex specified by the superordinate design inputs 210.

The in-memory model builder 223 configures each software implement based on one or more contextual signals defined by the superordinate design inputs 210. As described in more detail below, software member emitters generate software code and other tangible software deliverables based on the selected and configured software members.

In some implementations, a particular software implement may be configured in several predefined ways, or adjusted in particular ways, depending on the configuration of a set of one or more patternable design aspects 212. The in-memory model builder 223 can store, for each software implement, data specifying the inputs that affect the software implement and how the software implement should be configured based on those inputs. When the in-memory model builder 223 determines that a particular software implement will be used, the in-memory model builder 223 can identify any inputs in the superordinate design inputs that affect the configuration of the particular software implement and configure the particular software implement according to the identified inputs.

To illustrate, the software complex generator 120 may include a software implement for an undo/redo feature. This software implement specifies the information to produce a single instance of an undo/redo feature. The superordinate design inputs 210 may specify that the undo/redo feature will be used in data objects that include multiple different types of data. The undo/redo feature may be implemented differently depending on the type of data. In this example, the in-memory model builder 223 may identify the software implement for the undo/redo feature and generate multiple configurations of the software implement in the in-memory model 230.

The in-memory model builder 223 uses the superordinate design inputs 210 to select the software implements for use in building the in-memory model 230. The in-memory model builder 223 also determines how each software implement should be configured (e.g., in one or more multiple forms) based on the context defined by the whole of the superordinate design inputs 210 and configures the software implements accordingly to generate the in-memory model 230.

The in-memory model builder 223 can identify interdependencies between two or more software members based on the superordinate design inputs and configure the software implements such that the software members will be interoperable. As used here, interoperable means that each software member of the software complex acts in a consistent way towards data and other software elements acted on by the software members. For example, the in-memory model builder 223 may identify that multiple software members will share and act on a particular piece of data. In a bottom up approach, different development teams might define characteristics of the piece of data differently causing the different software members to be unable to share the data. For example, one software member may specify that the piece of data be an integer data type, while another software member may specify that the piece of data be a floating point data type causing the two software members to be unable to share the data without reprogramming by a software developer. The in-memory model builder 223 can identify that multiple software members will share the data and ensure that the data is defined consistently (i.e., the same) in the configured implements used to generate each software member. Thus, each software member will be able to operate on the same data.

In some implementations, the in-memory model builder 223 selects and configures a set of software implements for the in-memory model 230 based on the patternable design aspects 212 of the superordinate design inputs 210. In this example, the in-memory model builder 223 does not select or configure software implements to control how the non-patternable design aspects are implemented in software members. The in-memory model builder 223 may include in the in-memory model 230 non-patternable design aspects (e.g., the implementation-level code of non-patternable design aspects) and data that specify which software members (or type(s) of software members) should include, or be configured based on, the non-patternable design aspects. For example, a non-patternable design aspect may include custom code for a server application that will be a member of a software complex. A user may write the custom code using implementation-level design aspects (e.g., implementation-level code) of the software complex architectural language. That is, in some implementations, the custom code is not simply a snippet of code written in another programming language and imported into the software complex generator 120.

The user may specify using the software complex architectural language that custom code is to be included in server application software members. The in-memory model builder 223 can receive as part of the superordinate design inputs 210 the custom code and data indicating that the custom code is to be included in server application software members. In response, the in-memory model builder 223 can include in the in-memory model 230 the custom code and the data that indicates that the custom code is to be included in server application software members. The appropriate software member emitters 241-249 (e.g., a server application emitter) can identify this data and, in response to identifying the data, include the custom code (e.g., after converting the code to a native language) in the server application output by the software member emitter.

The set of software member emitters 241-249 emit respective software members 261-269 based on the in-memory model 230. For example, the software member emitters 241-249 may use the configured software implements of the in-memory model 230 and/or custom code defined by non-patternable design aspects to emit the respective software members 261-269.

Each software member emitter 241-249 is designed to emit a particular type of software member 261-269 and the software complex generator 120 can include a dedicated software member emitter for each type of software member that can be generated by the software complex generator 120. For example, the software complex generator 120 includes a database emitter 241 that emits databases (or a database schema) based on the in-memory model 230. The example software complex generator 120 also includes a server emitter 242 that emits server applications (e.g., in the form of executables); a business component emitter 243 that emits business components (e.g., with business rules and/or logic); three different client application emitters 244-246 that each emit client applications for a particular type of client device or operating system; a web page emitter 247 that emits web components for a web server; a file format emitter 248 that emits file formats (e.g., custom file formats); and other appropriate software member emitters 249 based on the types of software members output by the software complex generator 120.

The software complex generator 120 can include software member emitters for specific types of software members. For example, the software complex generator 120 may be capable of producing multiple different types of databases.

In this example, the software complex generator 120 may include a corresponding software member emitter for each type of database.

The in-memory model builder 223 can select, from a set of available software member emitters indexed in an emitter index 227, software member emitters for a software complex based on the in-memory model 230 and/or the superordinate design inputs 210. In particular, the in-memory model builder 223 selects the software member emitters based on the software members 261-269 that should be produced for the software complex 260. For example, if the in-memory model 230 indicates that a particular type of database is to be generated and a client application for a particular type of operating system is to be generated, the in-memory model builder 223 can select the emitter for the particular type of database and the emitter for client applications having the particular type of operating system.

Each software member emitter 241-249 accesses the in-memory model 230 and identifies relevant data in the in-memory model 230 for emitting its particular type of software member. For example, each software member emitter 241-249 may be designed to identify particular key structures, particular types of configured software implements, custom code that is to be included in its software member, and/or particular types of data included in the in-memory model 230. To illustrate, a database emitter may be designed to evaluate each configured data type (and other configured software implements) to identify data that may be stored in the database. The database emitter may also be designed to identify, in the in-memory model 230, custom code that is designated as being included in a database schema or database. For example, the in-memory model 230 may include, for the custom code, data that specify that the custom code should be included in a database. The database emitter can then generate a database schema for the database based on the identified data for storage in the database. Each software member emitter can emit a respective tangible software member based on the data accessed by the software member.

Each software member emitter 241-249 is designed to output a defined type of software member based on the relevant information identified in the in-memory model 230. For example, a database emitter that generates a database schema for a particular type of database is designed to identify data objects in the in-memory model, determine how to represent the data objects in a table definition (schema), and output the schema. The software member emitters output software members that are tangible software deliverables based on a subset (or the entirety) of the software implements included in the in-memory model 230.

In some implementations, each software member emitter 241-249 includes pre-programmed logic that the software member emitter uses to generate its software member based on the relevant information that the software member emitter identified in the in-memory model 230. For example, a software member emitter may include pre-programmed logic that controls how the software member emitter generates a software member based on one or more relevant configured software implements in the in-memory model 230.

A software member emitter can include one or more emitter-specific implements that the software emitter uses to generate its software member. An emitter-specific implement can specify emitter-specific configurations to a software implement of the in-memory model 230. For example, an emitter-specific implement may specify additions to a particular software implement that controls how the software emitter generates its software member. The software emitter may make local additions to a configured implement by referencing the original implement in the in-memory model and by associating the new implements with the original implement. However, in some implementations, the software emitter may not be able to change the original implements included in the in-memory model 230. In some implementations, an emitter-specific implement for a particular software emitter is only visible to the particular software emitter. Emitter-specific implements are described in more detail below with reference to FIG. 2C. In some implementations, an emitter-specific implement can describe how to produce a single instance of a particular software feature or element that is specific to that emitter. For example, a database emitter may include an implement that specifies how to build certain tables based on the context defined by one or more software implements.

For custom code defined by non-patternable design aspects, one or more of the software member emitters 241-249 may be designed to convert the custom code that is written using the software complex architectural language into a native language of the software members output by the respective software member emitters 241-249. For example, a client application emitter that emits software applications for devices having a particular platform may be designed to convert the custom code to the native code of the particular platform.

In some implementations, there may be a one-to-one mapping of custom code defined using the software complex architectural language and the native language generated by a software member emitter. In this example, the software member emitter uses the mapping to convert the custom code to the native language. The software member emitter can then include the native language version of the custom code in the appropriate location of the code of the software member.

In some implementations, the defined type of software member generated by each software member emitter can differ from the defined type of software member generated by each other software member emitter. That is, there may be one software emitter for each type of software member that is output by the software complex generator 120.

Some software member emitters may emit multiple software members for a software complex. For example, a software complex may include multiple databases, multiple client applications or components, or multiple instances of another type of software member. In such cases, the software member emitter may identify relevant data for each instance in the in-memory model 230 and emit the software members based on that information. In another example, a single file format emitter may emit multiple types of file formats rather than having a dedicated software emitter for each type of file format.

Figure 2B:
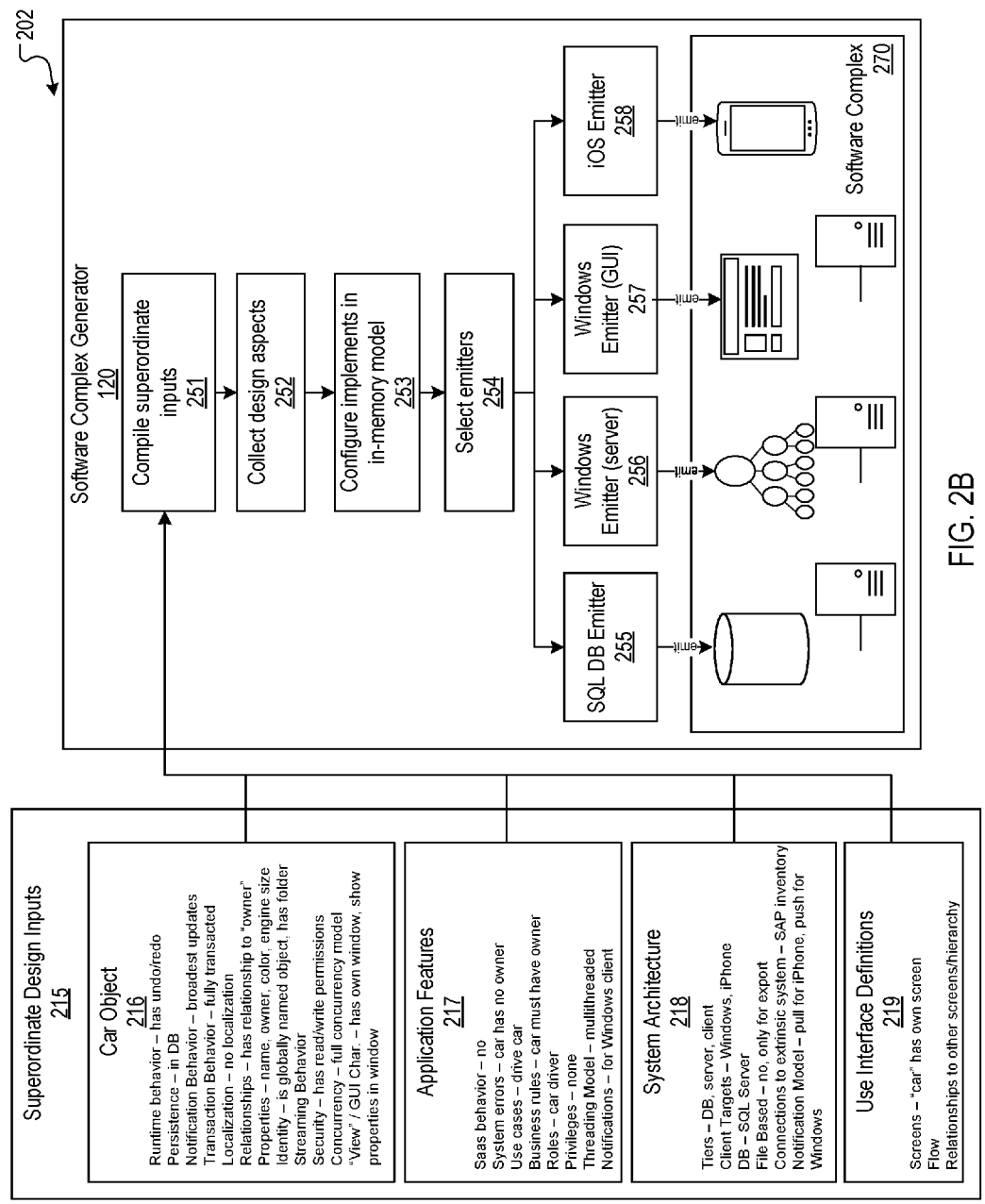
FIG. 2B is a block diagram of an example data flow for generating a software complex.

FIG. 2B is a block diagram of an example data flow 202 for generating a software complex 270. In this example, a user has defined design aspects for software complex 270 that includes a car object 216. In particular, the user has defined, as superordinate design inputs 215, a car object 216 that includes additional design aspects that define features of the car object. These example design aspects include undo/redo behavior, persistence in a database, broadcast update notifications, and so on. The user has also defined, as superordinate design inputs 215, application features 217, system architecture features 218, and user interface definitions 219.

The software complex generator 120 receives and compiles the superordinate design inputs (251). For example, the compiler 221 of the software complex generator 120 may compile the superordinate design inputs 215 and check the syntax and grammar of the superordinate design inputs 215. The compiler 221 can also evaluate the logic, integrity, and consistency of design aspects codified in the superordinate design inputs 215.

The software complex generator 120 collects the design aspects specified by the superordinate design inputs (252). For example, the in-memory model builder 223 of the software complex generator 120 may collect each design aspect included in the car object 216, the application features 217, system architecture features 218, and user interface definitions 219.

The software complex generator 120 configures implements for the car object 216 (and other design aspects) in the in-memory model (253). As the implement for the car object 216 affects several different software members of the software complex 270, the car object's design aspects (or portions thereof) are included in several different configured software implements. For example, the car object 216 indicates that it will be persisted in a database. Based on this design aspect, the in-memory model builder 223 can determine that the software complex 270 should include a database software member for storing data related to the car object 216. In turn, the in-memory model builder 223 can identify and configure one or more software implements that control how the database will be output by a database emitter. As the system architecture features 218 indicate that the database is an SQL database, the in-memory model's relevant implements will be configured based on the selection of SQL databases.

The user interface definitions 219 indicate that the car object will have its own screen. As such, the in-memory model builder 223 can configure software implements for user interface components for the car object, including the screen. The in-memory model builder 223 can configure other appropriate software implements based on the superordinate design inputs 215 and include each configured software implement in an in-memory model for the software complex 270.

The in-memory model 230 selects software member emitters to emit software members for the software complex 270 based on the in-memory model. In this example, the in-memory model builder 223 selects an SQL database emitter 255 to emit an SQL database; a Windows™ emitter 256 for emitting a server application; a Windows™ emitter 257 for emitting Windows™ applications; and an iOS™ emitter 258 for emitting a client application for devices that run iOS™. Of course, other software member emitters can also be selected for other software members of the software complex 270. The software member emitters 255-258 access relevant data (e.g., software implements and data thereof) from the in-memory model and emit their respective software members.

Figure 2C:
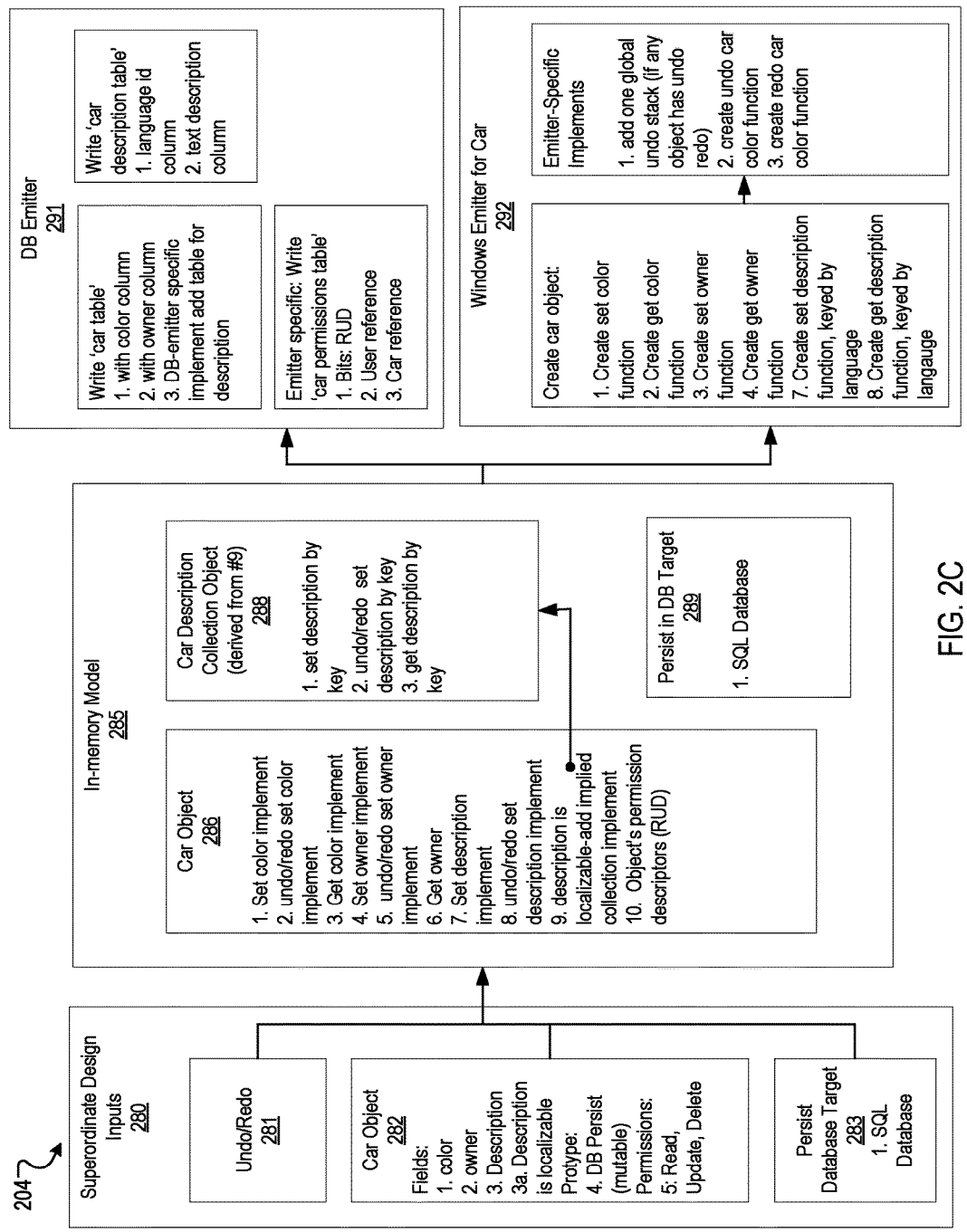
FIG. 2C is a block diagram of another example data flow for generating a software complex.

FIG. 2C is a block diagram of another example data flow 204 for generating a software complex. In this example, a user has defined as superordinate inputs 280 a car object 282 with several features, an undo/redo feature 281 for the whole software complex, and a persist database target feature 283 that specifies that data should be persisted in an SQL database. The car object 282 includes data types of color, owner, and description. In addition, the description has been defined as a localizable data type. Each of the data types are to be stored in the SQL database.

The in-memory model builder 223 can build an in-memory model 285 based on the superordinate design inputs 280. In this example, the in-memory model builder 223 has identified and configured a car object implement 286 that includes several implements. In particular, the car object implement 286 includes a set implement for each data type, e.g., color, owner, and description; a get implement for each data type; and an undo/redo implement for each data type. The in-memory model builder 223 can determine that the set and get implements should be included in the in-memory model 285 based on the data types and other configurations defined for the car object 282 in the superordinate design inputs 280. In addition, the in-memory model builder 223 can determine that an undo/redo implement should be included in the in-memory model 285 for each set function based on the undo/redo feature 281 in the superordinate design inputs.

The in-memory model builder 223 can also identify and configure a car description collection object implement 288 in response to the description data type being localizable. This allows for the particular description displayed on a user interface to be determined locally based on a key, e.g., based on a language of the user. The configured car description collection object implement 288 includes a set description by key implement, an undo/redo set description by key implement, and a get description by key implement.

The in-memory model builder 223 can also identify and configure a persist-in-database target implement 289 based on the persist-in-database target feature 283 and optionally other superordinate design inputs 280. The persist-in-database target implement 289 controls how the SQL database schema will be configured.

The in-memory model builder 223 can select a database emitter 291 and a Windows™ emitter 292 for the car object based on the in-memory model 285. In particular, the in-memory model builder 223 can select the database emitter 291 based on the car object implement having data that is to be stored in a database, e.g., based on the set and get implements of the car object implement 286. The in-memory model builder 223 can select the Windows™ emitter 292 to generate an application that enables access to and enables modification of car data stored in the database.

The database emitter 291 is designed to identify data object implements, e.g., the car object implement 286 and car description collection object 288, and database implement 289. The database emitter 291 can also be designed to identify other relevant implements in the in-memory model 285 and/or non-patternable design aspects (e.g., those that are to be included in the database) included in the in-memory model 285. Based on implements, data of the identified implements, and any non-patternable design aspects, the database emitter 291 configures and generates a database or schema and stored procedures for the database. In this example, the database emitter 291 configured a database that includes a car table and a car description table based on the car object implement 286 and the car description collection object implement 288. The car table includes a color column for the color data type of the car object 282 and an owner column for the owner data type of the car object 282. As the undo feature is not relevant to the database emitter 291, the database emitter 291 can ignore undo implements.

The database emitter 291 can include an emitter-specific implement that allows the database emitter 291 to add a table for the car object user permissions data. As the permissions table is not relevant to other software members, this emitter-specific implement can be local to the database emitter 291. The database emitter 291 can determine to use the emitter-specific implement based on the inclusion of the user permissions data in the in-memory model 285 and then use the emitter-specific implement to create the table. The emitter-specific implement can specify how the table is to be created, e.g., based on the types of user permissions data (e.g., read, write, update, delete), other data in the in-memory model 285, and/or software implements or other data of the in-memory model 285 previously identified by the database emitter 291.

The Windows™ emitter 292 can create a car object and certain functions for the car object based on the car object implement 286 of the in-memory model 285. In particular, the Windows™ emitter 292 can create in a Windows application functionality for set and get functions for the different data types of the car object 282. The Windows™ emitter 292 can also create in a Windows™ application a set description function and get description function that are keyed by language for the localized description data.

The Windows™ emitter 292 can also include emitter-specific implements. For example, the Windows™ emitter 292 can include an implement for generating an undo stack if any object has undo/redo. The Windows™ emitter 292 can also include an implement for generating undo and redo functions for each data type to which undo/redo applies.

Figure 3:
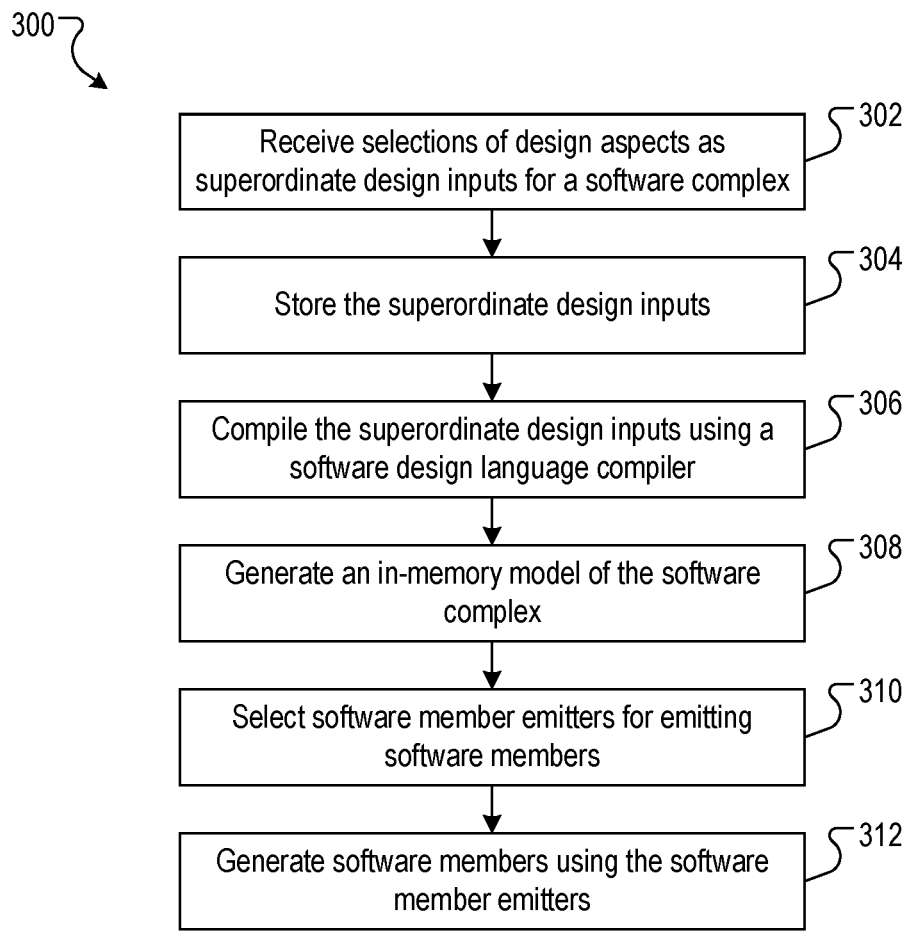
FIG. 3 is a flow chart of an example process for generating a software complex.

FIG. 3 is a flow chart of an example process 300 for generating a software complex. Operations of the process 300 can be implemented, for example, by a data processing apparatus, such as the software complex generator 120 of FIG. 2A. The process 300 can also be implemented by instructions stored on computer storage medium, where execution of the instructions by a data processing apparatus cause the data processing apparatus to perform the operations of the process 300.

Selections of design aspects as superordinate design inputs for a software complex are received (302). For example, a user may specify the design aspects using a software complex architectural language. The design aspects can include one or more patternable design aspects and/or one or more non-patternable design aspects. Each design aspect corresponds to a desired feature of the software complex. For example, one design aspect may correspond to the desire to store data in a database, while another design aspect may specify a sorting feature for the data. The design aspects as a group make up the superordinate design inputs for generating the software complex.

The superordinate design inputs are stored (304). For example, the software complex generator 120 may receive the superordinate design inputs and store the superordinate design inputs in a data storage system. In a particular example, the superordinate design inputs may be stored in one or more files.

The superordinate design inputs are compiled, for example, using a software complex architectural language compiler (306). This compilation can include parsing files that include the superordinate design inputs and checking the syntax and grammar of the superordinate design inputs specified using the software complex architectural language. The compiling may also include evaluating the logic, integrity, and consistency of design aspects codified in the superordinate design inputs.

An in-memory model of the software complex is generated based on the superordinate design inputs (308). For example, an in-memory model builder, such as the in-memory model builder 223 of FIG. 2A, may generate the in-memory model based on the superordinate design inputs. The in-memory model builder 223 can generate the in-memory model by selecting software implements based on the superordinate design inputs and configuring the software implements based on the superordinate design inputs. An example process for generating an in-memory model is illustrated in FIG. 4 and described in more detail below.

Software member emitters are selected for emitting software members for the software complex (310). For example, the in-memory model builder 223 may select software member emitters based on the in-memory model and/or the superordinate design inputs. The software member emitters may be selected based on software members that are to be emitted for the software complex. For example, if the in-memory model indicates that the software complex is to include a database, the in-memory model builder 223 may select an appropriate database emitter to emit the database or a database schema for the database.

The software members are generated using the software member emitters (312). Each selected software member emitter may access the in-memory model and identify relevant data and/or configured software implements for use in emitting its corresponding software member. For example, a database emitter may be configured to identify, in the in-memory model, a configured software implement for the database and/or data that is to be stored in the database. Based on the identified data, the database emitter can emit the database and/or a schema for the database.

Figure 4:
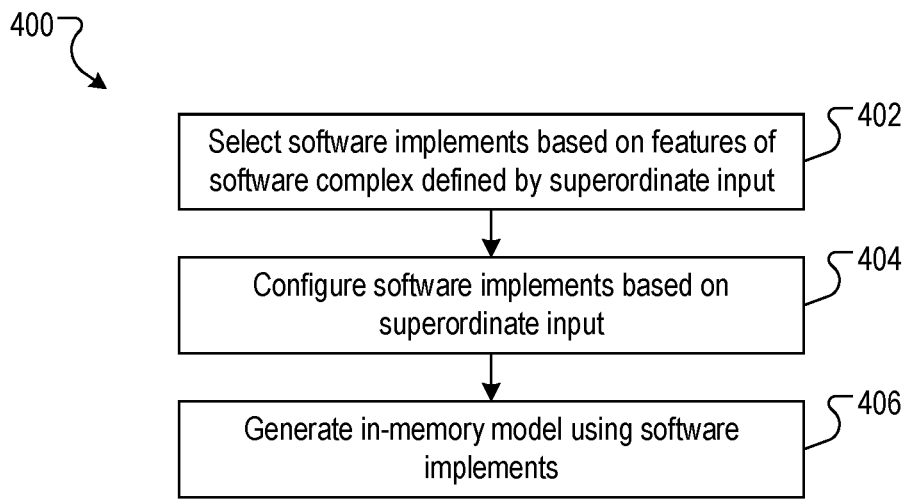
FIG. 4 is a flow chart of an example process for generating an in-memory model for a software complex.

FIG. 4 is a flow chart of an example process 400 for generating an in-memory model for a software complex. Operations of the process 400 can be implemented, for example, by a data processing apparatus, such as the software complex generator 120 of FIG. 2A. The process 400 can also be implemented by instructions stored on computer storage medium, where execution of the instructions by a data processing apparatus cause the data processing apparatus to perform the operations of the process 400.

Software implements are selected based on features of a software complex defined by superordinate inputs (402). For example, an in-memory model builder, such as the in-memory model builder 223 of FIG. 2A may receive superordinate design inputs for a software complex. Each superordinate design input is a codification of a design aspect in software complex architectural language. The in-memory model builder can identify the software implements based on the design aspects specified by the superordinate design inputs.

The identified software implements are configured based on the superordinate design inputs (404). As described above, each software implement is a software representation of the information used to produce a single instance of a software feature or element and each software implement can be configured based on context defined by superordinate design inputs. In some implementations, the software complex generator 120 includes data that specify which superordinate design inputs affect the configuration of each software implement and how the software implement is affected by each specified superordinate design input. The in-memory model builder 223 can use this data along with the superordinate design inputs to configure the identified software implements.

An in-memory model is generated using the configured software implements (406). For example, the in-memory model builder 223 can generate the in-memory model and include each configured software implement in the in-memory model. The in-memory model builder 223 can also store the in-memory model for later use, e.g., for baseline comparison between in-memory models.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
receiving data specifying selections of design aspects as superordinate design inputs for a software complex that will include a group of software members including at least one executable, the design aspects including a software as a service design aspect that specifies that the software complex will include one or more software as a service features;
generating an in-memory model of the software complex including identifying and configuring, based on the superordinate design inputs, a set of software implements that each specify an implementation of one or more software features of the software complex in one or more types of software members of the software complex, the set of software implements including one or more software implements for implementing the one or more software as a service features;
selecting, based on the superordinate design inputs and the in-memory model, a plurality of software member emitters, each software member emitter being arranged to emit a software member of a defined type, wherein each type is different from each other type; and
for each selected software member emitter, generating a software member of the defined type of the selected software member emitter, wherein at least one of the selected software member emitters generates a software member that implements at least one of the one or more software as a service features.

2. The method of claim 1, wherein receiving data specifying selections of design aspects comprises:
providing a user interface that enables a user to select and define design aspects for the software complex; and
receiving, at the user interface, selections and definitions of the design aspects.

3. The method of claim 1, wherein the software member that implements at least one of the one or more software as a service features comprises a software as a service database.

4. The method of claim 1, further comprising:
receiving updated data specifying one or more updated design aspects for the software complex subsequent to generating the software members;
generating an updated in-memory model based on the one or more updated design aspects; and
generating, based on the updated in-memory model, software members for a second software complex different from the software complex.

5. The method of claim 4, wherein the updated in-memory model is generated based on the updated design aspects and at least one design aspect specified by the received data that was not updated.

6. The method of claim 4, wherein the one or more updated design aspects include a platform for the second software complex that is different from each platform of the software complex.

7. The method of claim 6, wherein the platform for the second software complex is associated with one or more software members that are included in the second software complex but that are not included in the software complex.

8. A system, comprising:
a data processing apparatus; and
a memory storage apparatus in data communication with the data processing apparatus, the memory storage apparatus storing instructions executable by the data processing apparatus and that upon such execution cause the data processing apparatus to perform operations comprising:
receiving data specifying selections of design aspects as superordinate design inputs for a software complex that will include a group of software members including at least one executable, the design aspects including a software as a service design aspect that specifies that the software complex will include one or more software as a service features;
generating an in-memory model of the software complex including identifying and configuring, based on the superordinate design inputs, a set of software implements that each specify an implementation of one or more software features of the software complex in one or more types of software members of the software complex, the set of software implements including one or more software implements for implementing the one or more software as a service features;

selecting, based on the superordinate design inputs and the in-memory model, a plurality of software member emitters, each software member emitter being arranged to emit a software member of a defined type, wherein each type is different from each other type; and for each selected software member emitter, generating a software member of the defined type of the selected software member emitter, wherein at least one of the selected software member emitters generates a software member that implements at least one of the one or more software as a service features.

9. The system of claim 8, wherein receiving data specifying selections of design aspects comprises:
providing a user interface that enables a user to select and define design aspects for the software complex; and
receiving, at the user interface, selections and definitions of the design aspects.

10. The system of claim 8, wherein the software member that implements at least one of the one or more software as a service features comprises a software as a service database.

11. The system of claim 8, wherein the operations comprise:
receiving updated data specifying one or more updated design aspects for the software complex subsequent to generating the software members;
generating an updated in-memory model based on the one or more updated design aspects; and
generating, based on the updated in-memory model, software members for a second software complex different from the software complex.

12. The system of claim 11, wherein the updated in-memory model is generated based on the updated design aspects and at least one design aspect specified by the received data that was not updated.

13. The system of claim 11, wherein the one or more updated design aspects include a platform for the second software complex that is different from each platform of the software complex.

14. The system of claim 13, wherein the platform for the second software complex is associated with one or more software members that are included in the second software complex but that are not included in the software complex.

15. A non-transitory computer storage medium encoded with a computer program, the program comprising instructions that when executed by a data processing apparatus cause the data processing apparatus to perform operations comprising:
receiving data specifying selections of design aspects as superordinate design inputs for a software complex that will include a group of software members including at least one executable, the design aspects including a software as a service design aspect that specifies that the software complex will include one or more software as a service features;

generating an in-memory model of the software complex including identifying and configuring, based on the superordinate design inputs, a set of software implements that each specify an implementation of one or more software features of the software complex in one or more types of software members of the software complex, the set of software implements including one or more software implements for implementing the one or more software as a service features;

selecting, based on the superordinate design inputs and the in-memory model, a plurality of software member emitters, each software member emitter being arranged to emit a software member of a defined type, wherein each type is different from each other type; and for each selected software member emitter, generating a software member of the defined type of the selected software member emitter, wherein at least one of the selected software member emitters generates a software member that implements at least one of the one or more software as a service features.

16. The non-transitory computer storage medium of claim 15, wherein receiving data specifying selections of design aspects comprises:
providing a user interface that enables a user to select and define design aspects for the software complex; and
receiving, at the user interface, selections and definitions of the design aspects.

17. The non-transitory computer storage medium of claim 15, wherein the software member that implements at least one of the one or more software as a service features comprises a software as a service database.

18. The non-transitory computer storage medium of claim 15, wherein the operations comprise:
receiving updated data specifying one or more updated design aspects for the software complex subsequent to generating the software members;
generating an updated in-memory model based on the one or more updated design aspects; and
generating, based on the updated in-memory model, software members for a second software complex different from the software complex.

19. The non-transitory computer storage medium of claim 18, wherein the updated in-memory model is generated based on the updated design aspects and at least one design aspect specified by the received data that was not updated.

20. The non-transitory computer storage medium of claim 19, wherein:
the one or more updated design aspects include a platform for the second software complex that is different from each platform of the software complex; and
the platform for the second software complex is associated with one or more software members that are included in the second software complex but that are not included in the software complex.

* * * * *